United States Patent [19]
An et al.

[11] Patent Number: 6,031,904
[45] Date of Patent: Feb. 29, 2000

[54] SERVICE ORDER MECHANISM FOR TELEPHONE SUBSCRIBER

[75] Inventors: Yafan An, Plano, Tex.; Eric Bierman, Ottawa; Michael A. Kelly, Kinburn, both of Canada

[73] Assignee: Nortel Networks Corporation, Montreal, Canada

[21] Appl. No.: 08/878,966

[22] Filed: Jun. 19, 1997

Related U.S. Application Data

[60] Provisional application No. 60/028,760, Oct. 23, 1996.

[51] Int. Cl.$^7$ ...................................................... H04M 3/42
[52] U.S. Cl. .................. 379/201; 379/93.12; 379/93.23; 370/352; 370/466
[58] Field of Search ..................................... 379/201, 114, 379/115, 93.12, 93.23, 265, 142; 370/352, 401, 466, 467, 465

[56] References Cited

U.S. PATENT DOCUMENTS

| | | | |
|---|---|---|---|
| 4,984,155 | 1/1991 | Geier et al. | 379/93.12 |
| 5,473,679 | 12/1995 | La Porta et al. | 379/201 |
| 5,475,746 | 12/1995 | Miller et al. | 379/201 |
| 5,485,511 | 1/1996 | Iglehart et al. | 379/156 |
| 5,544,236 | 8/1996 | Andruska et al. | 379/201 |
| 5,629,978 | 5/1997 | Blumhardt et al. | 379/201 |
| 5,631,954 | 5/1997 | Evans et al. | 379/93.17 |
| 5,657,446 | 8/1997 | Pinard et al. | 379/201 |
| 5,668,857 | 9/1997 | McHale | 379/93.07 |
| 5,687,224 | 11/1997 | Alley, Jr. et al. | 379/201 |
| 5,696,809 | 12/1997 | Voit | 379/265 |
| 5,751,802 | 5/1998 | Carr et al. | 379/201 |
| 5,761,288 | 6/1998 | Pinard et al. | 379/201 |
| 5,778,178 | 7/1998 | Arunachalam | 395/200.33 |
| 5,790,173 | 8/1998 | Strauss et al. | 379/201 |
| 5,790,648 | 8/1998 | Bailis et al. | 379/201 |
| 5,799,285 | 8/1998 | Klingman | 379/93.12 |
| 5,838,682 | 11/1998 | Dekelbaum et al. | 370/401 |
| 5,845,267 | 12/1998 | Ronen | 705/40 |
| 5,850,433 | 12/1998 | Rondeau | 379/201 |
| 5,884,032 | 3/1999 | Bateman et al. | 379/201 |

*Primary Examiner*—Scott Wolinsky

[57] ABSTRACT

A system and method for allowing telephone subscribers to update over the Internet the features which are active on the telephone. A server on the Internet is connected to a profile repository which determines which features are active on each subscriber line. Subscribers with Internet access may access a special home page, and access their feature profile and make additions, deletions etc. to it. This eliminates the need for a human operator to process requests for changing feature profiles.

15 Claims, 16 Drawing Sheets

STEPHANIE, WELCOME TO YOUR PERSONAL TELEPHONE PROVISIONING SERVICE.

CALLING OUT

PERSONAL INFORMATION

PEOPLE CALLING YOU

MESSAGING

UTILITIES

REVERT
90

SAVE
92

EXIT
94

? HELP
96

HOW TO USE THE "SPEED CALL" FEATURE ON THE MERIDIAN BUSINESS SET

PRESS DN KEY OR LIFT RECEIVER

PRESS     | SPEED CALL |

PRESS A NUMBER KEY
(0 through 9)

| 1 | 2 | 3 |
| 4 | 5 | 6 |
| 7 | 8 | 9 |
| * | 0 | # |

PRESET NUMBER WILL BE DIALED AUTOMATICALLY

HOW TO USE THE "SPEED CALL" FEATURE ON THE LINK SETS

PRESS DN KEY OR LIFT RECEIVER

PRESS *

PRESS A NUMBER KEY
(0 through 9)

PRESET NUMBER WILL BE DIALED AUTOMATICALLY

HOW TO USE THE "AUTO LINE" FEATURE

PRESS [ AUTO LINE ]

AND YOUR PRESET NUMBER WILL BE DIALED AUTOMATICALLY.

CONFIRMATION OF CHANGES TO SAVE

YOU HAVE MADE CHANGES TO THE FOLLOWING FEATURES:

| SPEED CALL | ☑ CONFIRM | ☐ CANCEL |
| AUTO LINE | ☑ CONFIRM | ☐ CANCEL |
| CALL FORWARD | ☐ CONFIRM | ☑ CANCEL |

SERVICE ORDER MECHANISM FOR TELEPHONE SUBSCRIBER

RELATED APPLICATIONS

This application claims the benifit under Title 35, United States Code, Section 119(e) of the United States provisional application having the serial No. 60/028,760, filed on Oct. 23, 1996.

FIELD OF THE INVENTION

This invention relates to configuring different telephone feature profiles for different subscribers and, more particularly, to a system which permits a subscriber to add/change or delete features with respect to his/her particular telephone feature profile.

BACKGROUND OF THE INVENTION

Today, telephone subscribers need to interact with a telephone service provider's service representative to order new features or change existing ones. The addition, modification, activation or de-activation of features, when not performed through a service representative, often requires elaborate user interface actions which are difficult to remember (particularly when infrequently used) and difficult to verify. For example, for a customer to turn on the "call forward" feature, he/she needs to key in *73, wait for a reorder tone, and then key in the forwarded-to number.

SUMMARY OF THE INVENTION

What is proposed here is provide an alternate parallel mechanism to those subscribers who are also subscribers to an information communications network, for example an "Internet" service. The subscriber can locate his personal "telephone feature profile" on the telephone service provider's server on the Internet, access it via a password, such as his/her "calling card" PIN, and see at a glance the features and options currently active on his line/number. Additionally, the subscriber may submit requests to add/change/delete features, on-line.

As an example, we describe a scenario of how the "call forward" feature could benefit significantly from this approach. A person arriving at a new location, such as a hotel room, or someone else's home, could access his/her "telephone feature profile" via the hotel or friend's Internet access and activate his/her "call forward" feature with the number of the telephone in the hotel or friend's home. All calls would then be forwarded to the new location.

This mechanism removes the need for a human interface from some (growing) percentage of feature modification requests and thus reduces operating costs to telephone service providers.

Through the Internet, a visual and user-friendly interface can be provided to subscribers which significantly simplifies service order procedures. Subscribers would configure their feature complements and be given the resulting monthly cost, helping them understand real costs versus real benefits. In some cases, such as ISDN (integrated services digital network) service, where feature complements are more complex (to the point where the service representatives can often not answer the questions), a clearer exposition of what the features do in all of their permutations, by customer trial and error can be very beneficial. These frequent feature changes are managed by subscribers themselves.

According to a first broad aspect, the invention provides a feature ordering system for use in connection with a telephone network which implements features for individual subscribers on the basis of a feature profile stored for each subscriber DN (directory number), the feature ordering system comprising: a server acting directly or indirectly on the feature profiles, the server being connected to an information communications network and accessible by subscribers through the information communications network and permitting, when accessed by a subscriber, access to that subscriber's telephone feature profile for viewing and optionally changing, adding or deleting features by the subscriber.

According to a second broad aspect, the invention provides a service order system for allowing a subscriber having access to an Internet browser to select which features are active on a subscriber line having a particular directory number, the features being provided by a service provider having a feature profile repository containing feature profile information determining which features are active on the subscriber line, the service order system comprising: a server in communication with the feature profile repository and also with a communications network such as the Internet for presenting feature profile information on a subscriber's access unit connected to the server through the communications network, and for receiving changes, additions or deletions requested by the subscriber through their access unit.

According to a third broad aspect, the invention provides a method of updating features which are active on a subscriber line having a particular DN comprising: a subscriber accessing a feature management server with an access device with a connection through a communications network; the feature management server presenting a series of pages on the access device; the subscriber entering their DN on one of the pages and submitting this to the server; the server collecting from a feature profile repository feature profile information relevant to the DN entered by the subscriber and presenting this on one or more of the pages; the subscriber selecting on one or more of the pages changes, additions or deletions for the feature profile information and submitting this to the server; and the server making corresponding changes to the feature profile repository.

DETAILED DESCRIPTION OF THE PREFERRED EMBODIMENTS

Figure 1:
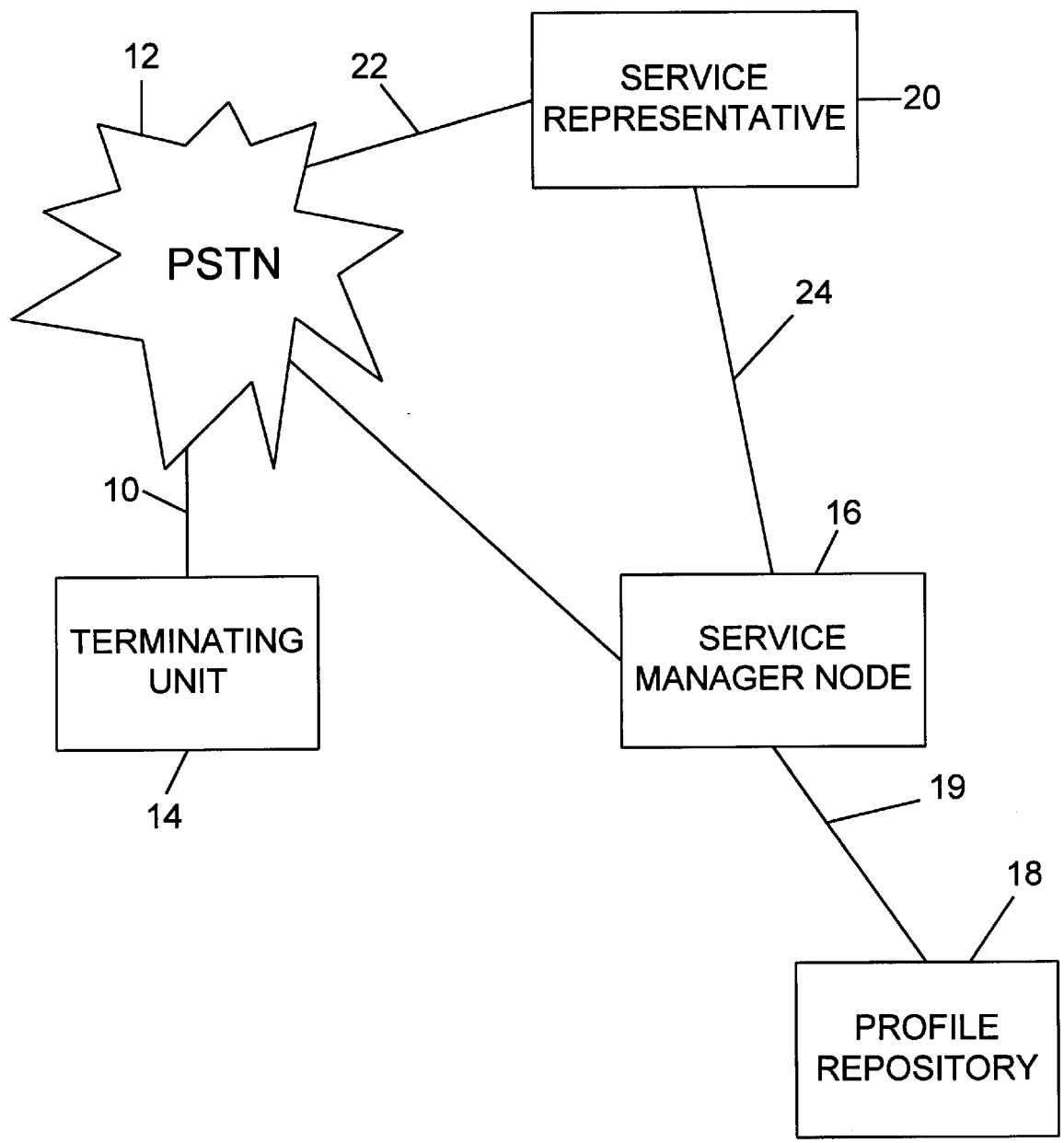
FIG. 1 is a block diagram of a conventional subscriber feature ordering system.

A high level block diagram showing the context for the conventional management of telephone line features is shown in FIG. 1. A subscriber has one or more service lines 10 (only one shown) connected to the PSTN (public switched telephone network) 12. These service lines may be conventional telephone lines, or more advanced lines such as ISDN lines. They may also represent wireless connections for mobile telephones or pagers. A terminating unit 14 such as a telephone, modem, fax etc. is connected to each line 10. Each service line is identifiable by a unique DN (directory number).

Typically, a plurality of features are available to a subscriber. Some features may be implemented directly with switches forming part of the PSTN 12, and other features may be implemented on peripheral processing platforms which may be, for example, AIN (advanced intelligent network) based, or IN (intelligent network) based. Examples of some well known features typically available to subscribers include call forward, call waiting, ring again, speed call, message waiting, 3-way conferencing, softkey programming, and 800 services.

The provision of the features is managed by "service manager programs" (or simply "service managers") running on service manager nodes 16 connected to or forming part of the PSTN 12. The service manager nodes are processing platforms for running the service managers and perhaps other functions as well. Each service manager has access to a respective profile repository 18 which identifies which features are to be provided on each line 10. The profile repository 18 for a given service manager is a memory storage allocation which may be stored on the respective service manager node 16, on the machine (such as a switch forming part of the PSTN) which implements the features, or on some other intermediate machine. For multiple features managed by multiple service managers, there will typically be multiple profile repositories 18. Alternatively the profile repositories may be collected together on a common intermediate machine or machines. In the case that the profile repositories 18 are stored separately from the service manager nodes 16, links 19 connecting them are required. In either case, the profile information for a given DN, which may be distributed across multiple profile repositories 18, will be collectively referred to as the "feature profile" for that DN. The feature profile is used to control the access to features. For example, the Call Waiting feature is a feature typically implemented by a switch forming part of the PSTN, and the profile repository for such features is usually stored on the switch providing local service to a particular line. With call waiting, a first ongoing telephone call between a subscriber and another party is interrupted when another call comes in from a second party to the subscriber's DN, thereby allowing the subscriber to speak to the second party while the first party is on hold and then to choose between talking to the first or the second party. When a subscriber does not have the call waiting feature active, the second party simply gets a busy signal. For this feature, a record in the memory of a switch would indicate whether the call waiting feature was active for a particular DN. When a call comes in to the subscriber with that DN while the subscriber is on the telephone, the switch consults the record and either provides or does not provide the feature.

Service representatives 20 are provided to assist subscribers in ordering features for activation on their lines 10. The term "service representative" refers to both a service representative terminal and a human operator operating the terminal. The service representatives 20 have connections 22 to the PSTN 12 through which subscribers can communicate with the service representatives 20, and the service representatives have access through proprietary telephone company lines 24, for example, to the service manager nodes 16 running the service managers which control the update of the feature profile information stored in the profile repositories 18.

With the conventional system of FIG. 1, when a subscriber wishes to modify his feature profile, he places a call which is connected through the PSTN 12 to one of the service representatives 20. The service representative 20 receives instructions for making the changes and passes these to the appropriate service manager which then updates the actual feature profile stored in the profile repository 18.

The invention provides a mechanism for the subscribers to configure the various services and features which are active on their lines 10 without the need for the involvement of a service representative 20.

Figure 2:
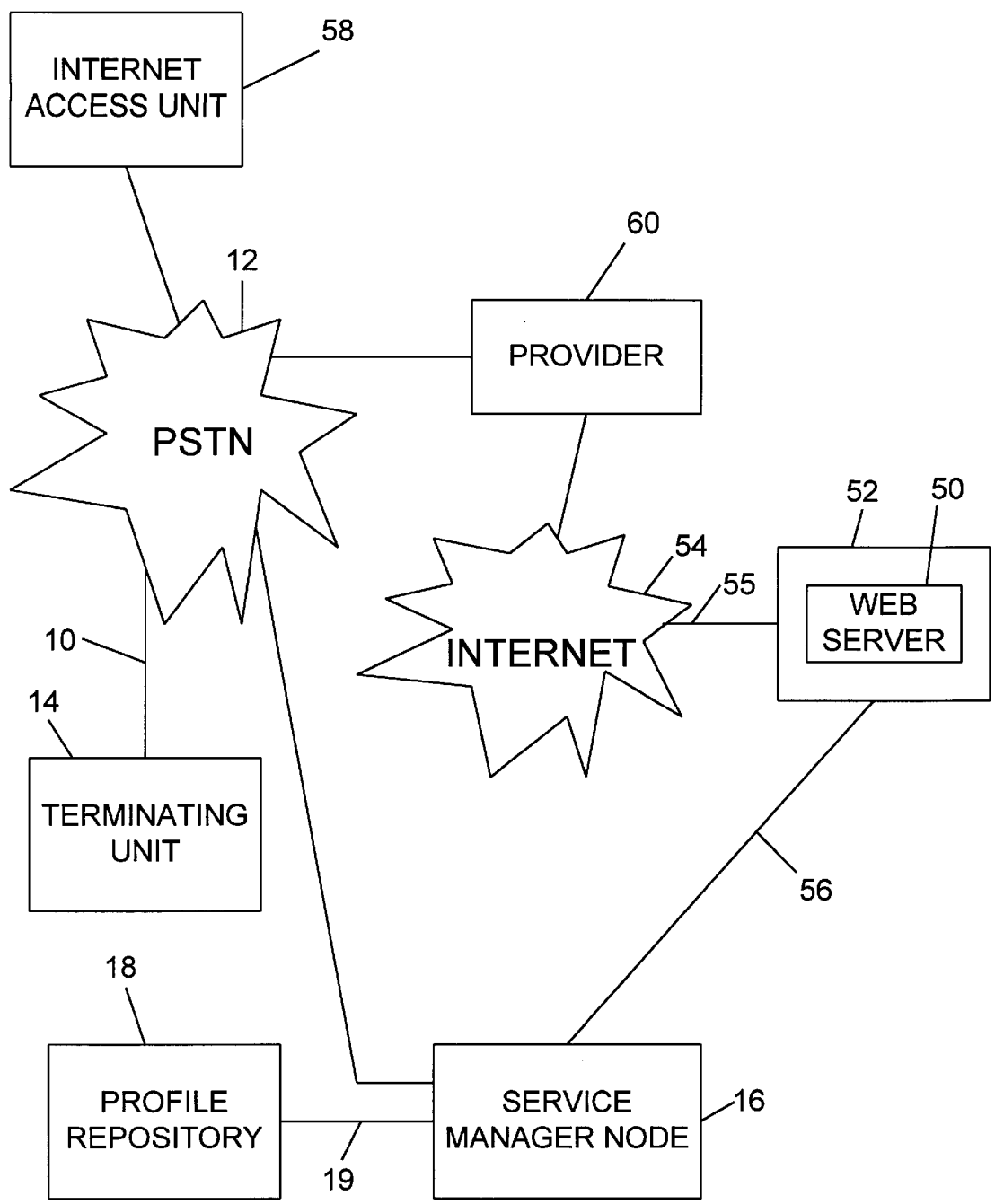
FIG. 2 is a block diagram illustrating the network configuration of one embodiment of the present invention.

Referring now to FIG. 2, an exemplary system architecture for implementing an SSPM (subscriber service provisioning manager) system according to the invention is shown. Elements which are in common with FIG. 1 are similarly labelled. An SSPM server is placed on a machine connected to/forming part of a public communications network. In the illustrated embodiment this is a Web server 50 running on a machine 52 which is accessible through the public Internet 54 through connection 55. The Web server 50 would typically be equipped to handle HTTP (hypertext transport protocol) and JAVA. The machine 52 running the Web server 50 may also store the profile repositories 18 referred to previously which are used to store the feature profiles, but preferably Web server 50 simply has access to the profile repositories 18. As indicated above, accessing a particular feature profile involves access through the service manager nodes 16 to profile information which may be stored on several profile repositories 18. The machine 52 running the Web server 50 preferably also stores a temporary replica of the feature profile for each DN. Feature profiles stored on the machine 52 will be referred to as "local feature profiles". As indicated, the machine 52 with the Web server 50 is connected to the public Internet 54, and is accessible on the WWW (World Wide Web). Local feature profiles are formulated as HTML (hypertext mark-up language) pages on the WWW for presentation to the subscribers. These HTML pages have a unique URL (uniform resource locator) which identify their location within the WWW. Communication between the Web server 52 and the service manager nodes 16 may be done over links 56 forming part of a private telephone company network, for example.

The subscriber has (or has access to) an Internet access unit 58 connectable to the Internet 54 or similar communications network through the PSTN 12 and an Internet service provider 60 for example. The Internet access unit 58 is any unit through which a subscriber is capable of connecting to the Internet 54 at a given time. This could be a computer in the subscriber's home connected through one of the previously mentioned service lines 10, a computer in a hotel, or an Orbiter wireless unit, to name a few examples.

Figure 3:
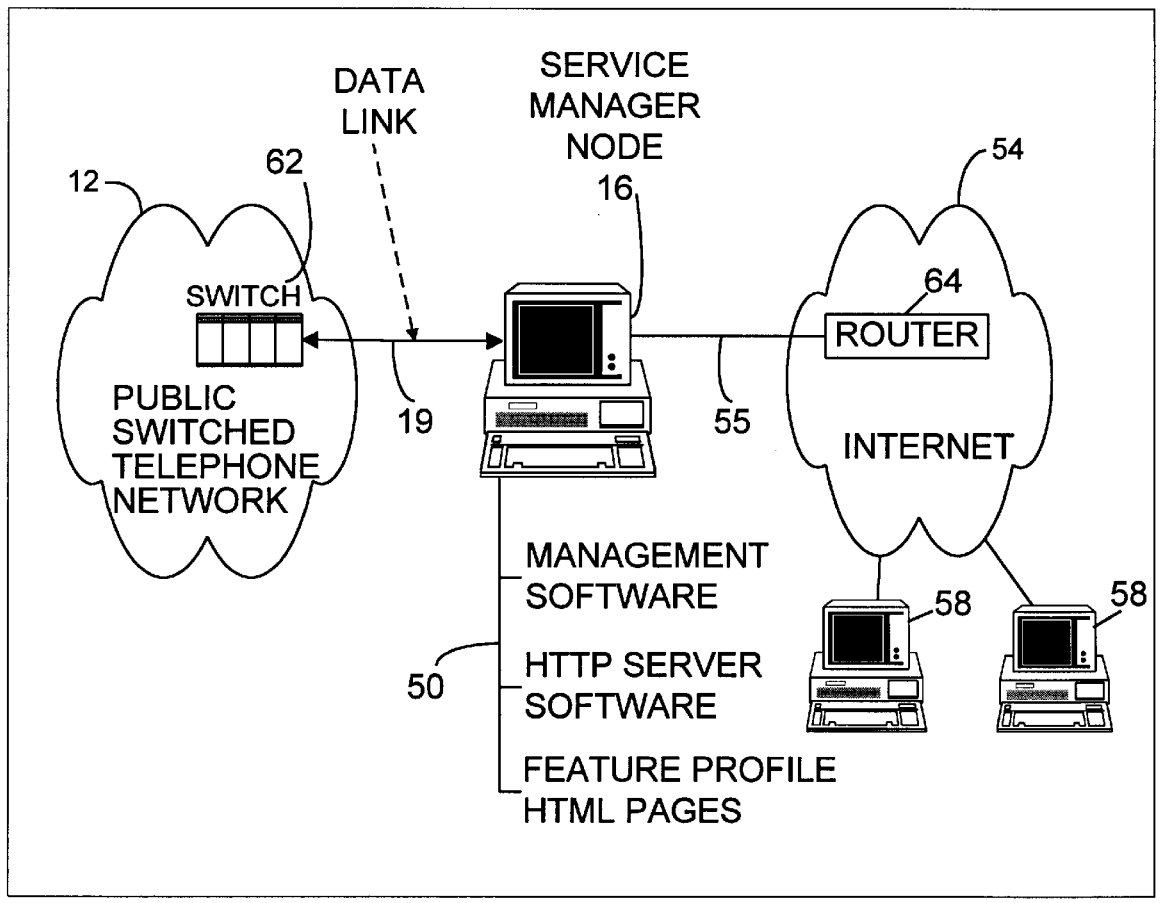
FIG. 3 is a block diagram illustrating the network configuration of another embodiment of the invention.

In the above described architecture, the Web server 50 is running on a machine 52 which is separate from the service manager nodes 16. Alternatively, as depicted in FIG. 3, one of the service manager nodes 16 may be used to run the Web server 50 thereby eliminating the need for a separate machine 52 for the Web server 50 and also eliminating the need for link 56. In this case the service manager node 16 is connected by link 19 to profile repository 18 on a switch 62 forming part of the PSTN 12 and to a router 64 forming part of the Internet 54. The service manager node 16 has management software consisting of service managers, HTTP server software for the Web server 50, and contains the temporary feature profile as HTML pages for down loading to the subscriber's Internet access unit 58. In this example, the machine realizing the features is the switch 62, and the profile repositories are also stored on the switch 62.

Figure 4:
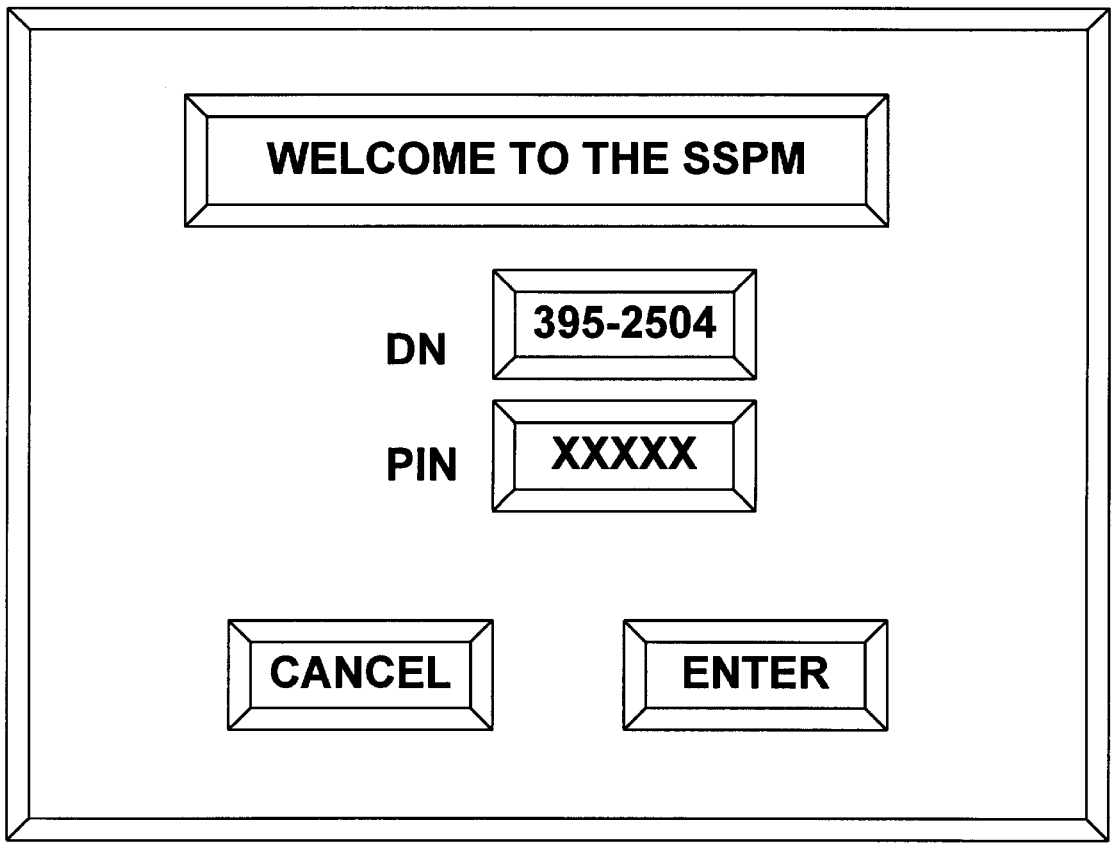
FIGS. 4 to 12 are illustrations of exemplary displays presented on the PC screen of a subscriber using the invention.

Now referring to both FIGS. 2 and 3, a subscriber can access and manipulate the feature profile for a given DN by connecting to the Web server 50 through the Internet 54. This is achieved by using a WWW browser such as Netscape Navigator running on the Internet access unit 58 to go to the unique URL associated with the relevant HTML pages on the Web server 50. The server 50 performs subscriber authentication by requesting the DN and the PIN (see FIG. 4 for example) through the browser. A security mechanism which could involve encryption and decryption known per se could be used to prevent revealing PINs to those tapping in on communications lines or intermediate servers or routers. Upon verification of this pair of numbers, the Web server 50 provides access to a series of HTML pages containing information about this particular DN. Once the subscriber is given access, the subscriber can navigate through the HTML pages using well understood browsing techniques.

The contents of the HTML pages could be almost without limit, showing perhaps current bill, detailed list of calls etc., as well as current features and cost what-ifs on possible feature complements. Via a mechanism such as an HTML "form" or a Java "applet", a subscriber can activate/deactivate features and change the parameters of those features, on-line. Initially, these changes are made to the local feature profile stored on the machine 52. The changes are committed to change the real data located in the profile repositories 18 at critical points, such as when the subscriber decides to "submit" one of the HTML forms. The machine 52 may also pre-process and validate the changes requested to reduce errors and improve efficiency.

Figure 5:
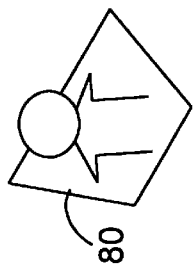
Figure 5:
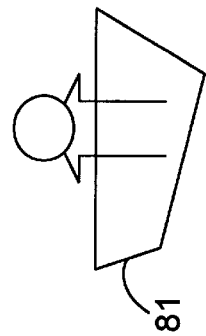
Figure 5:
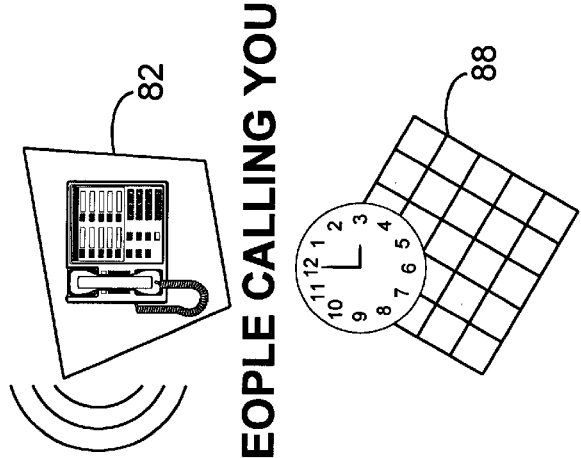
Figure 5:
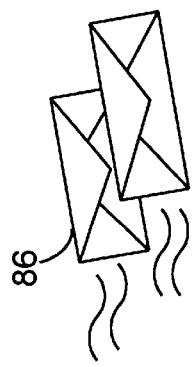
Figure 5:
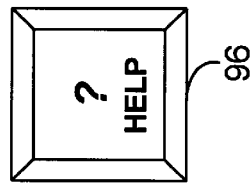
Figure 5:
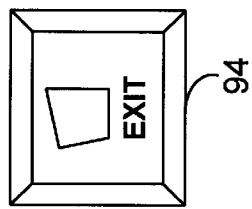
Figure 5:
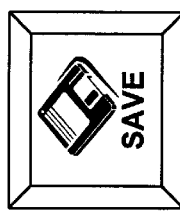
Figure 5:
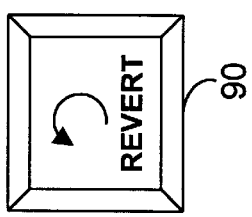
Figure 6:
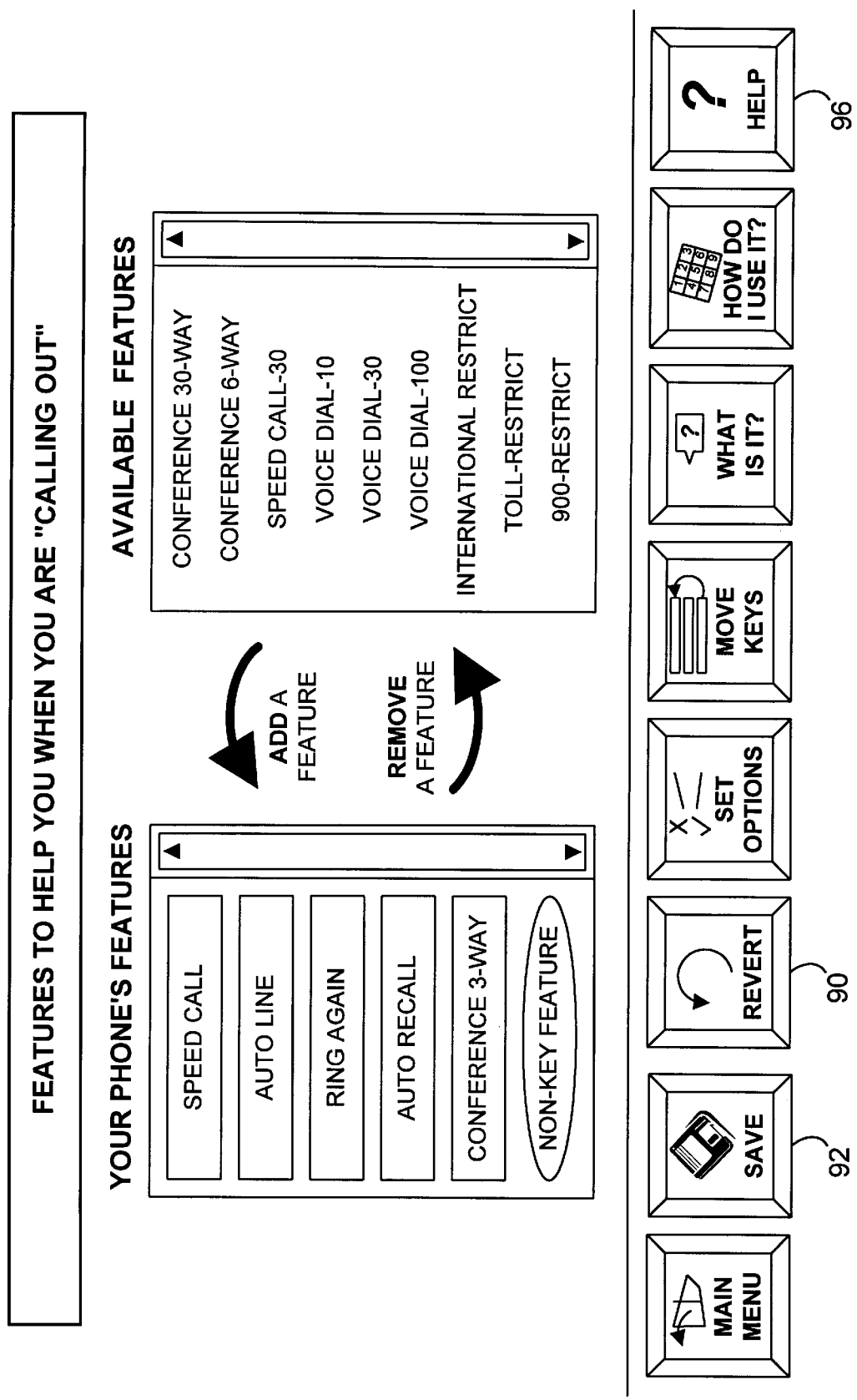

FIGS. 5–12 illustrate exemplary HTML pages which allow a subscriber to access and amend their feature profiles. FIG. 5 illustrates a first screen display that might be presented after verification. This displays different categories of interest in the form of icons. In the illustrated example, the icons represent the categories Calling Out 80, People Calling You 82, Personal Information 84, Messaging 86, and Utilities 88. By pointing and clicking on one of the icons, a more detailed page relating to that icon is displayed. For example, by clicking on the category Calling Out 80 the screen display shown in FIG. 6 is presented. This shows the subscriber the features on his profile which relate to calling out and enables him to update these by pointing and clicking.

Figure 7:
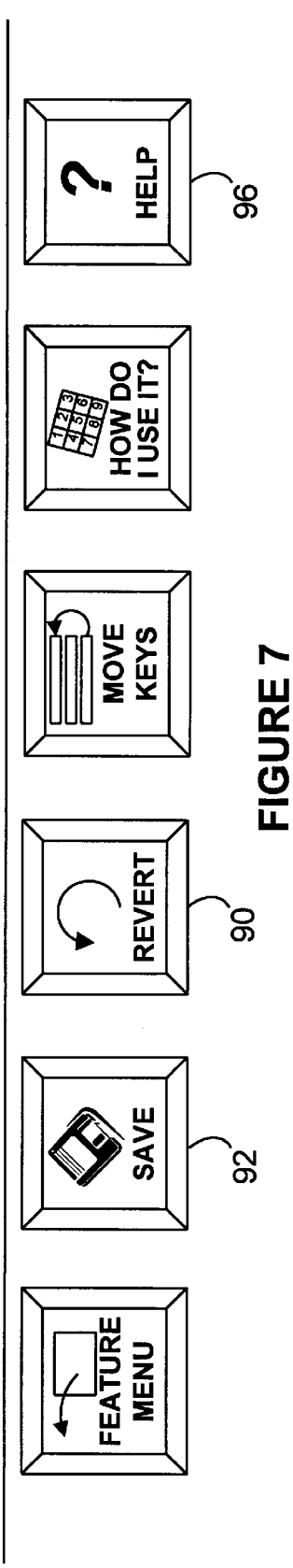
Figure 8:
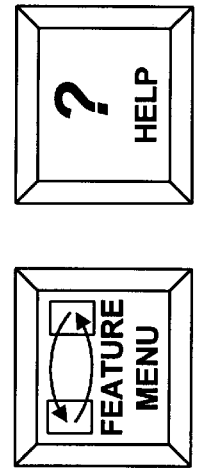
Figure 9:
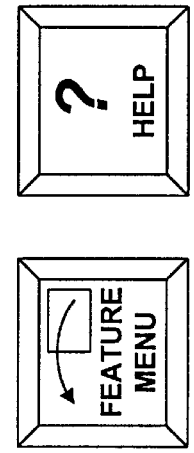
Figure 10:
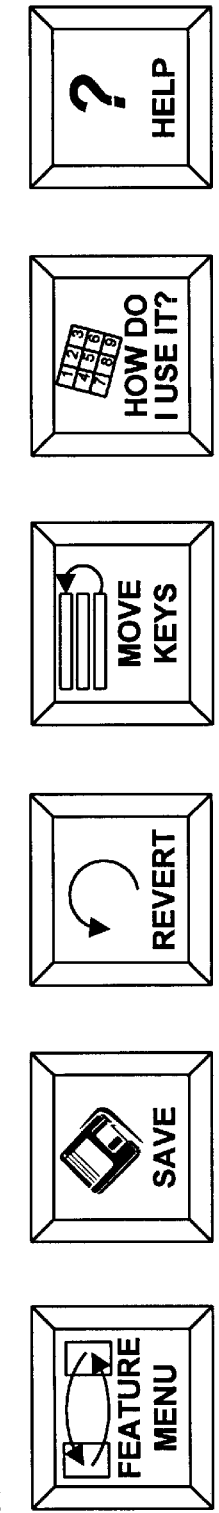
Figure 11:
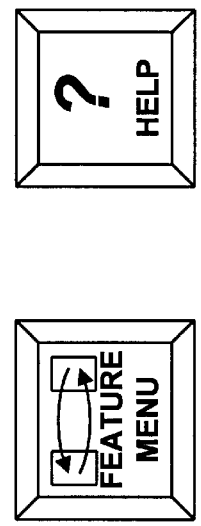
Figure 12:
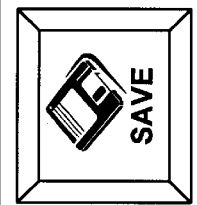
Figure 12:
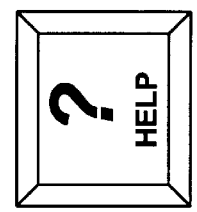
Figure 12:
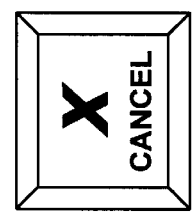

FIG. 7 illustrates the display that is presented to allow the subscriber to update his "speed call" list. At the bottom of FIGS. 5,6 and 7, additional icons are displayed which control various other operations of the HTML page. Clicking on the "Revert" icon 90 causes changes made to be undone, leaving the personal profile unchanged. Clicking on the "Save" icon 92 causes the changes made to be committed. In this case, the Web server 50 communicates with the service manager nodes 16 where the service managers update the actual feature profiles in the profile repositories 18. The "Exit" icon 94 exits the page, and the "Help" icon 96 provides further information on using the system. Figures s and 9 illustrate displays which explain how to use "speed call", FIG. 10 illustrates the display which allows the subscriber to update his "Auto dial" button and FIG. 11 shows how this option can be used, and FIG. 12 is a display confirming the changes that have been made.

When talking about a Web server, we mean a server using the Hyper Text Mark-up Language (HTML) and the Hyper Text Transfer Protocol (HTTP) for World Wide Web (WWW) style access. Java executable content may or may not be used (will be used in the preferred approach) as part of this HTML mechanism. The Uniform Resource Location (URL) is a unique address given to a browser to find the appropriate server using mechanisms already in place for Internet WWW use. The PIN referred to is a Personal Identity Number, which acts as a "password" to authenticate the customer. ISDN stands for Integrated Services Digital Network, but refers in the field to a single physical telephone line which provides two logical 64 Kb/s content channels and one 8 Kb/s signalling channel, all of which can be used for multiple purposes, hence complicating the feature complements possible. The Transaction Control Protocol (TCP) running over the Internet Protocol (IP) is generally referred to as TCP/IP. Finally "Internet" is a network of networks of a very large number of servers and clients for interchange of data, well described elsewhere.

The invention provides a simple means for a subscriber to control through one medium (the Internet) the features active on another medium (their telephone line) thereby reducing the need for a human service representative to service change requests from the subscriber, and reducing the need for the subscriber to remember meaningless codes. Changes are initially made on an HTML page, and then these changes are sent to the relevant service manager which then updates the actual feature profile in the profile repositories.

Depending on where the actual feature profile information is located, there are many ways for realizing the step of sending the changes from the Web server 50 to an individual profile repository 18. These will vary depending on whether the features involved are switch based features, or peripheral platform based, and will vary depending on the way in which the Web server 50 is connected to the service manager nodes 16. These differences however are transparent to a subscriber. A subscriber will be presented a unified view of their feature profile which is uniform across different subscriber lines, line types, and service providers etc.

Figure 13:
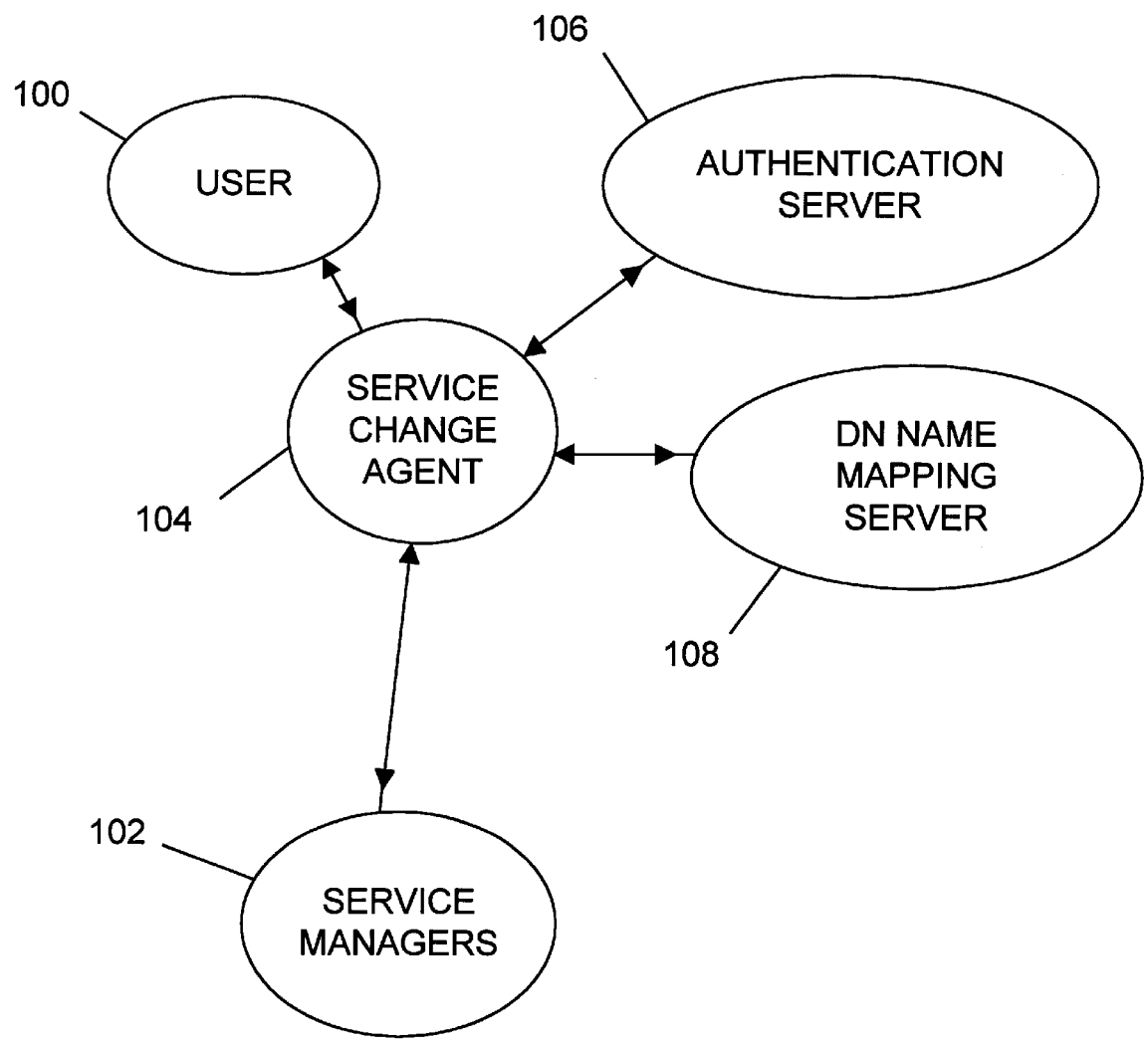
FIG. 13 is an illustration of the logical architecture of the invention.

The logical architecture of the SSPM according to the invention will be described with reference to FIG. 13. In this view of the invention, no attempt is made to map functionality onto specific hardware components. The logical entities described for FIG. 13 are realized by specific hardware components in the two specific examples described previously with reference to FIG. 2 and 3. The user 100 is a subscriber or human agent interacting with the SSPM. A service manager 102 is used by service providers to control the provision of services. The logical service manager 102 is related to the service managers running on the service manager nodes of FIGS. 2,3. It provides an interface to the profile repository and has a transactional interface to the rest of the world (create, read, update, delete). There may be many service managers if the user subscribes to many lines (wireline, wireless) or different services (pager, local and long distance) etc. The service change agent 104 is an application providing a graphical user interface which presents the user's service profile, allows the user 100 to modify it, and sends appropriate transactions to the requisite service managers 102 for update. In FIGS. 2 and 3, the Web server 50 produces the service change agent functionality. The service change agent 104 first validates the user 100 using an authentication server 106 prior to accessing any profile data. The DN name mapping server 108 is used to determine which service manager 102 is involved with the management of a specific service for a specific DN.

Figure 14:
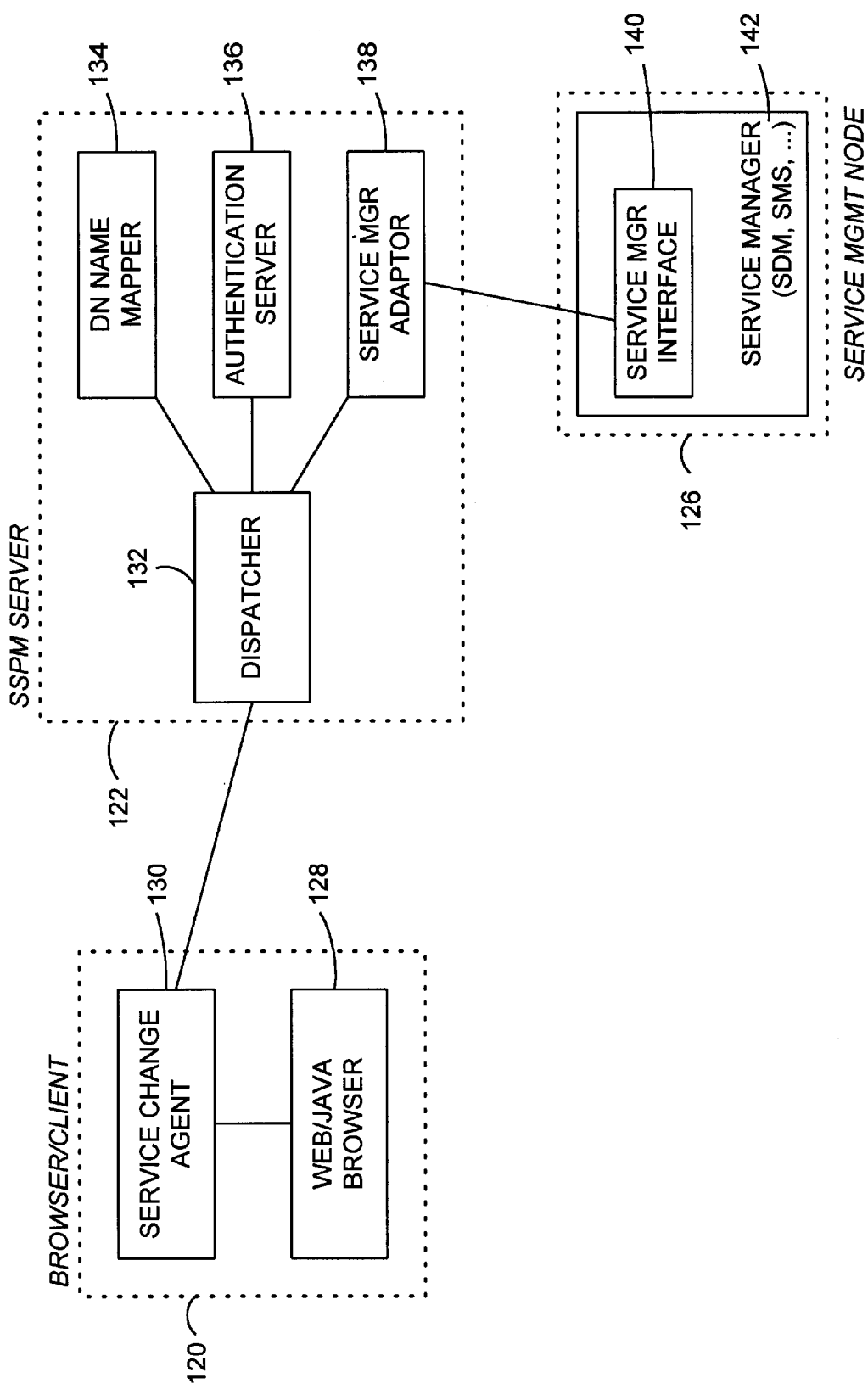
FIG. 14 is a high-level design block diagram of an embodiment of the invention.

Many ways of mapping the functionality of FIG. 13 onto specific equipment exist and FIGS. 2 and 3 provide only two examples of these. A high level design view of a preferred embodiment of an SSPM according to the invention will be described with reference to FIG. 14. This particular high level design may be broken down into three main components, these being a browser/client 120, an SSPM server 122, and a service management node 126. These components relate to the blocks in FIG. 2 and 3. The service manager nodes 126 are related to the service manager nodes 16 of FIGS. 1 and 2. The browser/client 120 is related to the Internet access unit 58 of FIGS. 2 and 3. The SSPM server 122 is related to the SSPM server 50 of FIGS. 2 and 3.

The browser/client 120 includes a Web browser 128 which provides a Java-supporting environment for the user on their computer. It is used to acquire an applet which is to run as the service change agent, launch the applet, and provide the necessary supporting context. It is also used to interpret HTML documents.

The service change agent 130 provides a user interface for accessing, browsing, and modifying subscriber feature profile information. It interacts with the SSPM server 122 to query and modify feature profile information. It performs limited pre-validation of the service options selected by the user, final validation being performed by a relevant service manager 142 or switch. It interacts with an authentication server 136 forming part of the SSPM server 122 to verify user and access privileges. It interacts with service managers 142 from service providers. All interactions are routed through a dispatcher 132 forming part of the SSPM server 122. The service change agent 130 runs in the user's environment as a user client. It also acts as a repository for the service change agent applets.

The SSPM server 122 has a dispatcher 132, a DN name mapper 134, an authentication server 136, and a service manager adaptor 138. The dispatcher 132 receives service change transactions from the service change agent 130 and routes them to the appropriate service manager 140 via the service manager adaptor 138, and routes service manager responses back to the service change agent. It also routes transactions to the DN name mapper 134 to resolve the subscriber's DN into the appropriate service manager type and specific address. The actual connections are managed by the service manager adaptor 138. The dispatcher 132 bridges the Internet and telephone company Intranet access domains, receiving Internet transactions and dispatching Intranet transactions to service managers 142 over proprietary telephone company links. It provides per transaction authentication using the authentication server 136, and may participate in encryption schemes as required.

The authentication server 136 validates the user's right to modify services for the specified DN through the user of a password, personal identification number, or some other mechanism. It performs individual authentication on a per transaction basis.

The service manager adaptor 138 encapsulates the specific protocols to be used to communicate with each class of service manager. It establishes and manages connections with a service manager 142 on a per transaction basis. It receives transactions from the dispatcher 132, formats them in a service manager specific protocol, and sends them to the service manager 142. It returns results generated by the service manager 142, formats them for sending to the dispatcher 132 which re-encapsulates them into the proper protocol for being sent to the service change agent 130.

The service manager interface 140 provides the service manager 142 end of the communications with the service manager adaptor 138.

The DN name mapper 134 maps Directory Numbers to specific service managers, and returns a service manager class to support selecting the appropriate service manager adaptor 138. It also returns a specific service manager 142 address which is typically in the service provider's private communication network. Mapping data may either be maintained locally, or be acquired dynamically through interactions with the telephone company OSS's or nodes.

Figure 15:
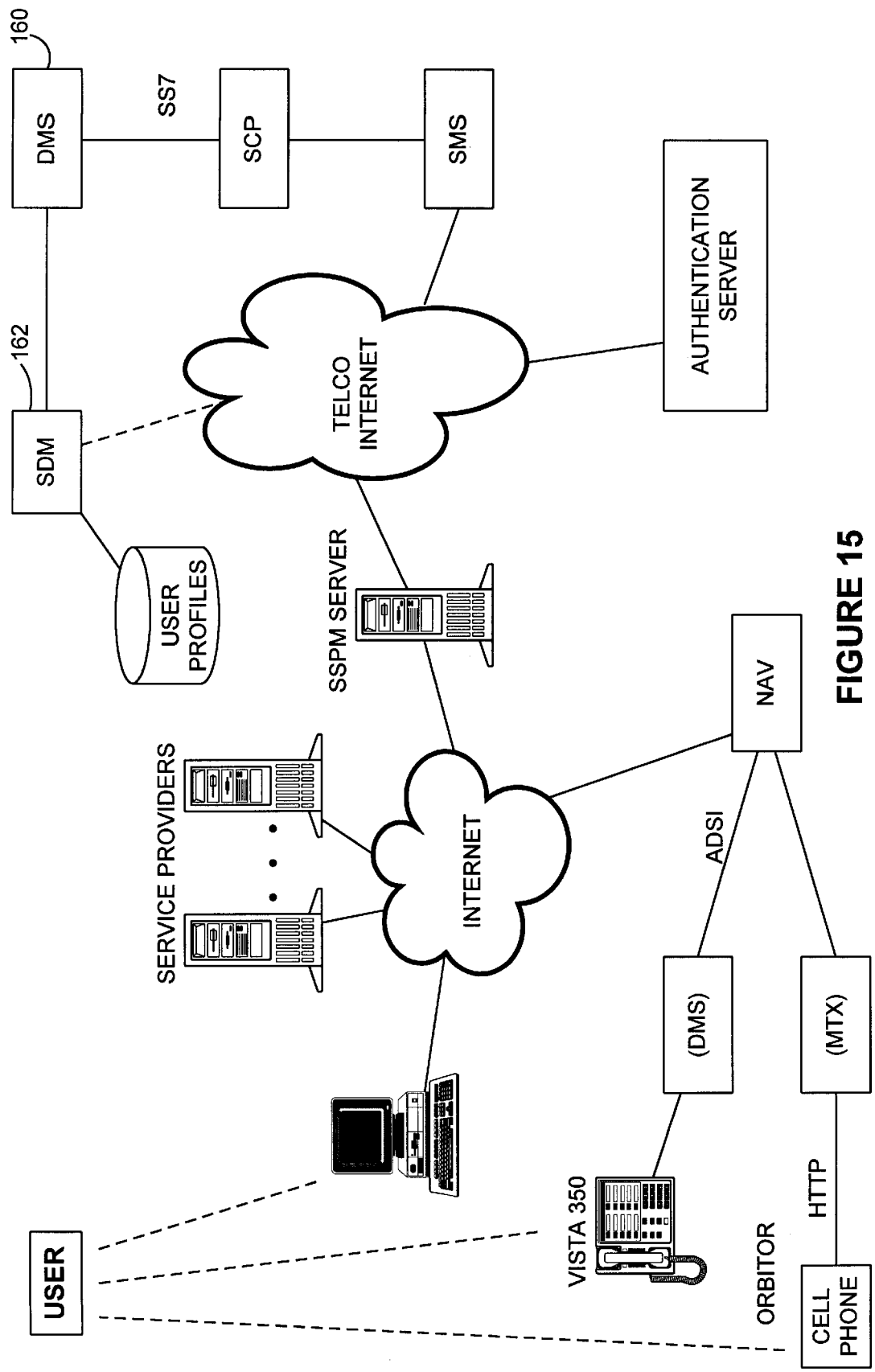
FIG. 15 is a block diagram of an embodiment of the invention.
Figure 16:
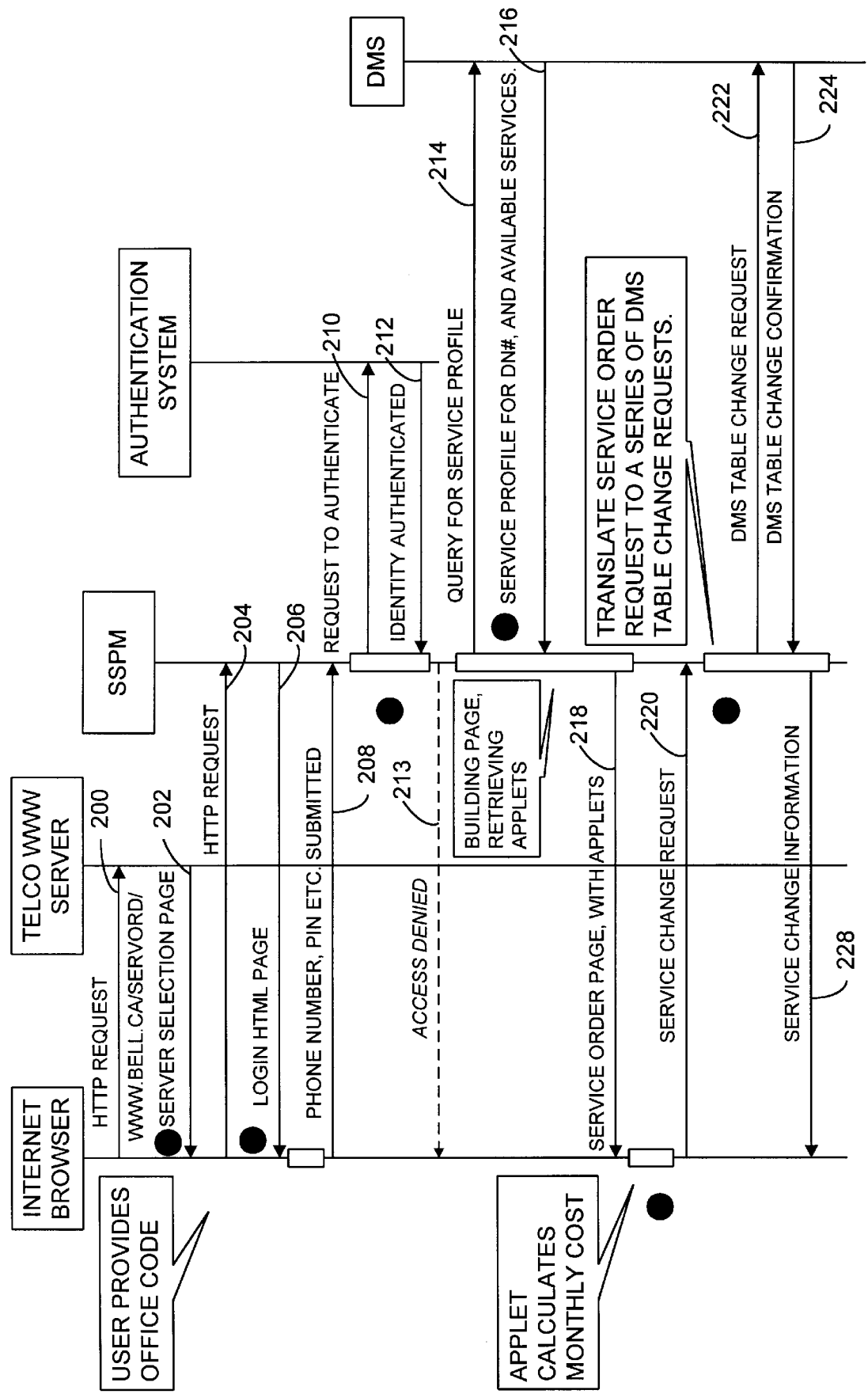
FIG. 16 is a high-level walk through for the embodiment of FIG. 15.

Another preferred aspect of the invention will be described with reference to FIGS. 15 and 16. According to this aspect of the invention, the machine implementing the features is a switch such as a DMS (digital multiplexed switch) 160 manufactured by Nortel. A system manager 162 is used to manage the operation of features on the switch 160 and to thereby assume the service manager role. The system manager 162 would normally be connected to a plurality of switches. The SDM performs 055 functions. The system manager may be a SDM (SuperNode Data Manager) also of Nortel which is a high performance computing platform that provides service management services to DMS switches. Tables stored on the DMS switch 160 contain tuples which indicate which features are active for a given DN. These tables assume the role of the profile repositories. The SDM can read, change, delete and add tuples to DMS tables, thus changing customer's service profiles. As before, a user is equipped with a unit for accessing the Internet. This may be a computer connected to the Internet, a screen based telephone set such as a Vista 350 connected to the Internet, or an Orbiter wireless unit connected to the Internet. Internet service providers typically mediate these connections to the Internet. An SSPM server is shown connected to the Internet also, and this provides the interface through which the user can access and modify his/her feature profile. Changes requested are communicated through the telephone company intranet to the SDM 162 to the DMS where they are implemented. The SDM 162 performs validation along the way.

In one implementation of the invention for this DMS/SDM environment, the SDM is equipped with the HTTP server and the SDM itself is connected to the Internet. As an alternative, if the SDM is not connected to the Internet, but is connected to a telephone company LAN (local area network), it only requires that somewhere on the LAN there be an HTTP server connected to the public Internet. In either case, the subscribers will be able to access the HTTP server from the public Internet. The HTTP server has a communication link to the DMS switch through the SDM. Through this link the HTTP server will be able to query and change the data tables on the DMS.

A high-level walkthrough for the use of the embodiment depicted in block form in FIG. 15 will be described with reference to FIG. 16. A user initially makes a connection to the Internet through their own Internet service provider, and brings up an Internet browser function. They then select a connection to their telephone company WWW server through an HTTP request (step 200). In response to this, the telephone company WWW server sends the server selection page back to the browser where it is displayed to the user (step 202). The telephone company WWW page may include a number of options, and the user selects the Subscriber Service Provisioning Manager option (step 204). This is sent to the SSPM server which returns a Login HTML page for display by the browser (step 206). The user completes the Login HTML page by typing in a phone number, PIN etc, and submits this as a further HTTP request (step 208). The SSPM server sends this information to an authentication server (step 210) which, after successfully authenticating the user information returns an "identity authenticated" message back to the SSPM server (step 212). If access is denied, then the user is given another opportunity to enter identification information (step 213). If the identity was successfully authenticated, then the SSPM Service Order application is started for that user. The service order application first sends a query to the DMS switch for the feature profile for the DN entered (step 214). This could be done either directly by the SSPM as shown in FIG. 16 or through the service change agent on the SDM, and with DMS table control facilities. The DMS sends back the service profile for that DN, and also sends back a list of the available services (step 216). The SSPM server uses this information to build a customized page to be sent to the browser. This page is generated based upon HTML templates in the SSPM database. It may include various applets and HTML entities for user interaction. These are sent back to the browser for display on the browser and use by the user (step 218). The user may select service changes. The applet may perform calculations based upon the changes requested and present the user with a calculated monthly cost for example. When a change is submitted, this is sent back to the SSPM server in response to which a "request processing" application will be started up (step 220). The service order request is translated into a series of DMS table change requests. These are sent to the DMS over the telephone company intranet (step 222). The DMS sends table change confirmation message back to the SSPM server (step 224), and the SSPM server then sends a service change confirmation back to the browser (step 226).

Numerous modifications and variations of the present invention are possible in light of the above teachings. It is therefore to be understood that within the scope of the appended claims, the invention may be practiced otherwise than as specifically described herein.

We claim:

1. A feature ordering system for use in connection with a telephone network which implements features for individual subscribers on the basis of a feature profile stored for each subscriber DN (directory number), the feature ordering system comprising:

a server acting directly or indirectly on the feature profiles, the server being connected to an information communications network and accessible by subscribers through the information communications network and permitting, when accessed by a subscriber, access to that subscriber's telephone feature profile for viewing and optionally changing, adding, or deleting features by the subscriber; and a profile repository storing the feature profiles, the profile repository managed by a service manager program on a service manager node, wherein the server performs a protocol conversion dependent on the type of the service manager node.

2. A system according to claim 1 wherein the server obtains the feature profiles through the service manager program and presents these to the subscriber on a subscriber access device, receives changes, additions, or deletions from the subscriber access device, and sends them to the service manager program which then changes the feature profiles stored in the profile repository.

3. A system according to claim 1 further comprising a subscriber authentication server, wherein a subscriber is prompted to enter identification information which is then authenticated by the authentication server before the subscriber is allowed to view or change the feature profile.

4. A system according to claim 1 wherein said server also provides access to billing information in relation to the DN.

5. A system according to claim 1 wherein said server provides cost estimates for features selected by the subscriber.

6. The system according to claim 1, wherein the server and the service manager program are each run on the service manager node, and the profile repository is stored on the service manager node.

7. A service order system for allowing a subscriber having access to an Internet browser to select which features are active on a subscriber line having a particular directory number, the features being provided by a service provider having a feature profile repository containing feature profile information determining which features are active on the subscriber line, the service order system comprising:

a server in communication with the feature profile repository and also with a communications network for presenting feature profile information on a subscriber's access unit connected to the server through the communications network, and for receiving changes, additions or deletions requested by the subscriber through their access unit, wherein the feature profile repository is managed by a service manager program on a service manager node, and the server performs a protocol conversion dependent on the type of the service manager node.

8. A service order system according to claim 7 wherein the profile repository is stored on a switch forming part of the PSTN (public switched telephone network), and the server is an HTTP (hypertext transport protocol) server which downloads feature profile information to the subscriber's access unit in the form of HTML (hypertext mark-up language) pages.

9. A service order system according to claim 8 wherein there are a plurality of said profile repositories each managed by a respective service manager program on a respective service manager node, each service manager node having a type;

wherein the server performs a protocol conversion to convert the profile information received from each service manager node to a form suitable for inclusion in the HTML pages, the protocol conversion being dependent on the type of the service manager node.

10. A service order system according to claim 9 further comprising a name mapper which determines which service manager controls the feature profile information for a given subscriber directory number.

11. A method of updating features which are active on a subscriber line having a particular DN (directory number), the method comprising:

a subscriber accessing a feature management server with an access device with a connection through a communications network;

the feature management server presenting a series of pages on the access device;

the subscriber entering their DN on one of the pages and submitting this to the server;

the server collecting from a feature profile repository feature profile information relevant to the DN entered by the subscriber, performing a protocol conversion dependent upon a type of service node containing a service manager program that manages the feature profile repository, and presenting this feature profile information on one or more of the pages;

the subscriber selecting, on one or more of the pages, changes, additions, or deletions for the feature profile information and submitting this to the server; and the server making corresponding changes to the feature profile repository.

12. A method according to claim 11 further comprising:

the subscriber entering security information together with the DN; and the server performing authentication on the security information before allowing the subscriber access to the feature profile information.

13. A method according to claim 11 further comprising the server providing on the access device information pertaining to the cost of the selected feature profile, wherein the subscriber is given the option of cancelling the submission of the changes made to the feature profile.

14. A method of updating features which are active on a subscriber line having a particular DN (directory number), the method comprising:

a subscriber accessing a feature management server with an access device over a communications network;

the subscriber receiving from the feature management server one or more pages on the access device;

the subscriber entering a DN on at least one of the one or more pages and submitting this to the feature management server;

the subscriber receiving feature profile information on one or more additional pages, wherein the feature profile information is from a feature profile repository which is managed by a service manager program on a service manager node, the feature profile information is relevant to the DN entered by the subscriber, and a protocol conversion is performed dependent upon a type of the service manager node; and the subscriber selecting, on at least one of the one or more additional pages, changes, additions, or deletions for the feature profile information and submitting this to the feature management server.

15. A method of updating features which are active on a subscriber line having a particular DN (directory number), the method comprising:

a feature management server being accessed by an access device;

the feature management server sending at least one first page to the access device;

the feature management server receiving at least one second page in which a DN has been entered;

the feature management server collecting from a feature profile repository feature profile information relevant to the DN, performing a protocol conversion dependent upon a type of a service node containing a service manager program that manages the feature profile repository, and sending this feature profile information in at least one third page;

the feature management server receiving at least one fourth page containing at least one change, addition, or deletion to the feature profile information; and the feature management server making one or more corresponding changes to the feature profile repository.

\* \* \* \* \*